May 14, 1963
A. M. BUSWELL ETAL
3,089,757
GAS SCRUBBING APPARATUS
Filed Aug. 31, 1959
3 Sheets-Sheet 2
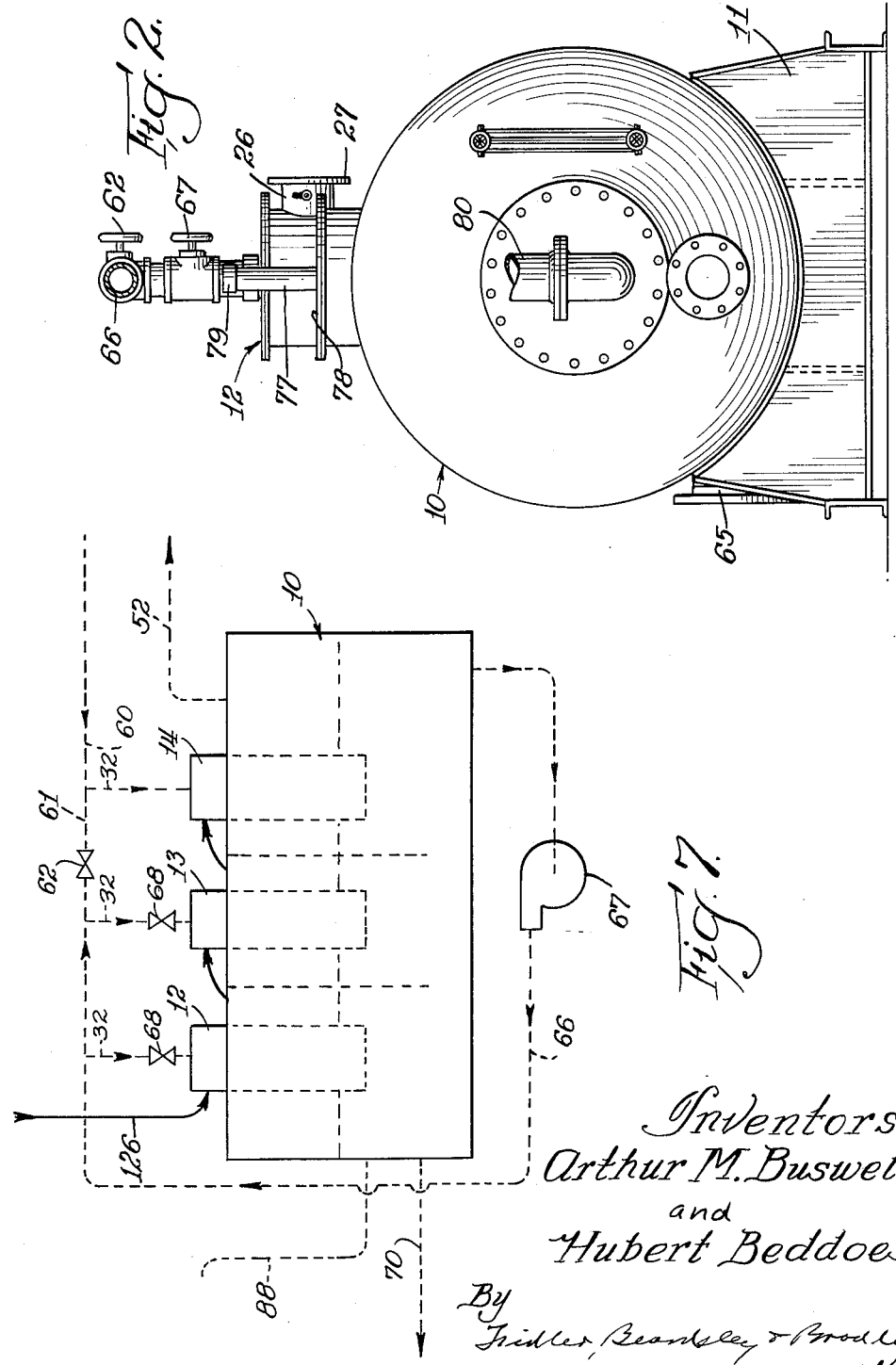
Inventors
Arthur M. Buswell
and
Hubert Beddoes
By
Fidler, Beardsley & Bradley
Att'ys.

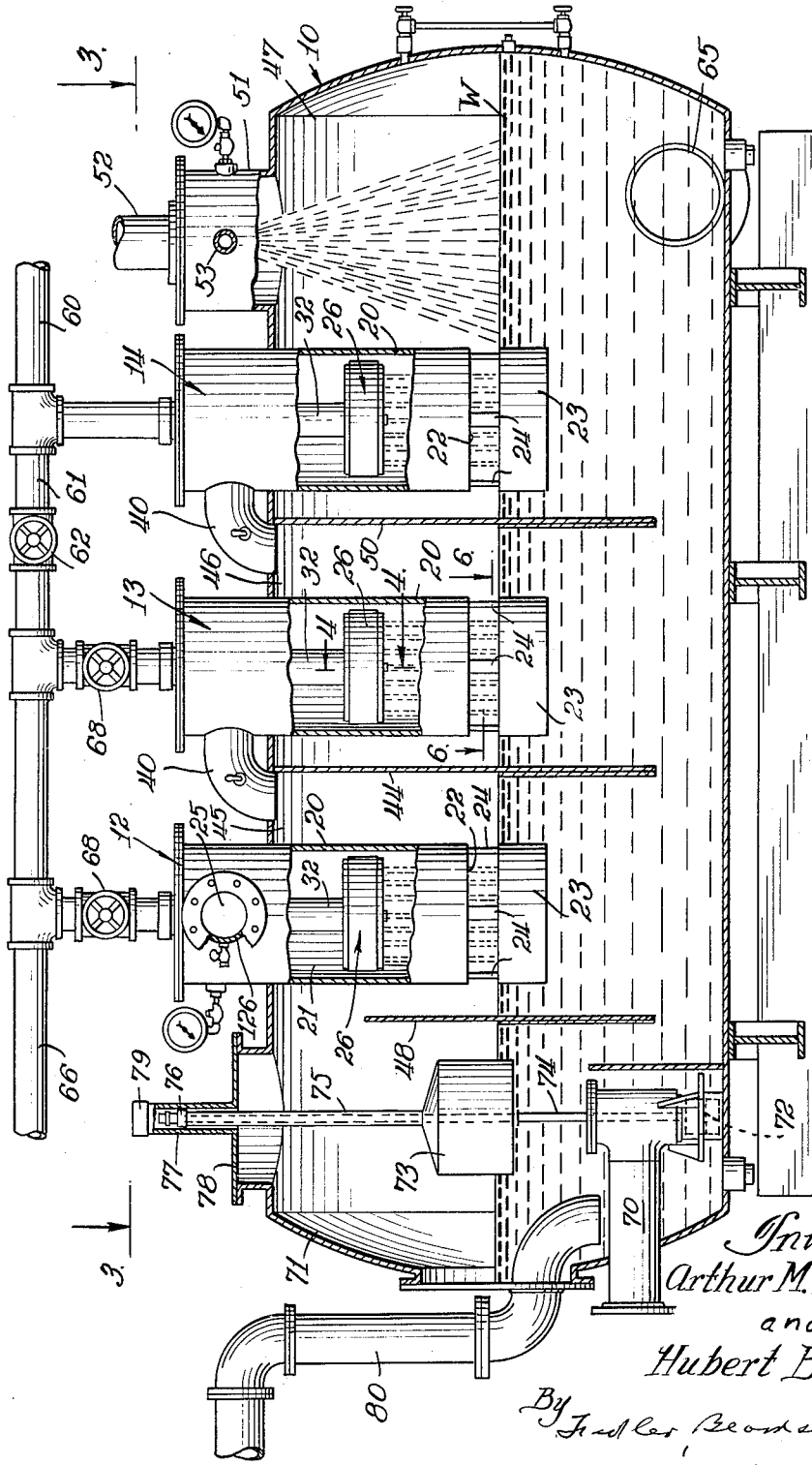

May 14, 1963 A. M. BUSWELL ETAL 3,089,757
GAS SCRUBBING APPARATUS
Filed Aug. 31, 1959 3 Sheets-Sheet 3
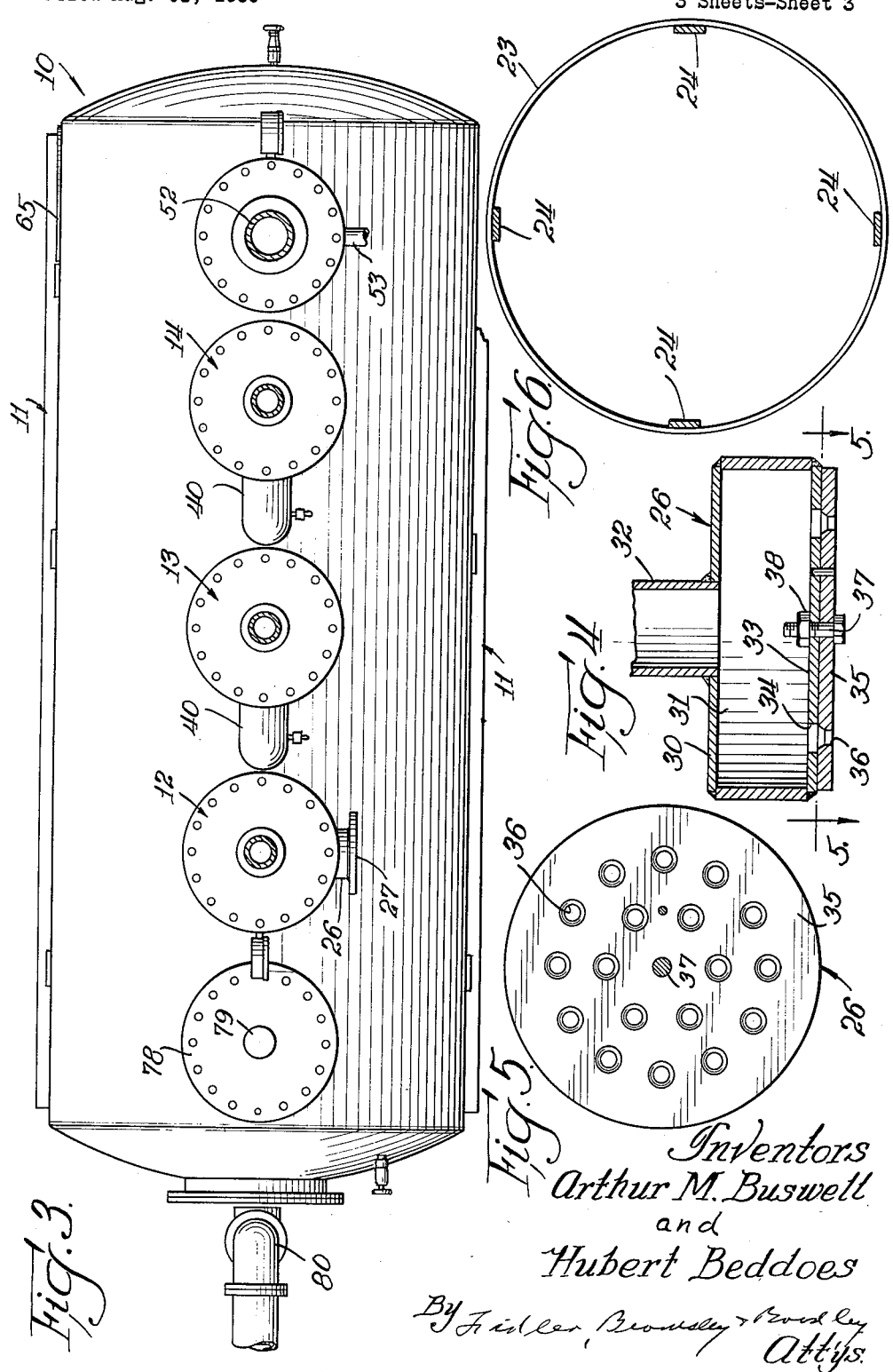
Inventors
Arthur M. Buswell
and
Hubert Beddoes

United States Patent Office 3,089,757
Patented May 14, 1963

3,089,757
GAS SCRUBBING APPARATUS
Arthur M. Buswell, Gainesville, Fla., and Hubert Beddoes, Chicago, Ill., assignors to Pacific Flush Tank Company, Chicago, Ill., a corporation of Illinois
Filed Aug. 31, 1959, Ser. No. 837,253
11 Claims. (Cl. 23—285)

This invention relates to a gas scrubbing process and to apparatus for carrying out such process. The invention has to do more particularly with an improved process and apparatus for removing a selected gas or selected gases from a mixture of gases.

This invention is especially suited to the scrubbing of gases produced in sewage treatment plants and particularly sludge gases and the invention is described in connection with such application. However, it will be understood that the invention is not thus limited but is adapted to other applications.

In the treatment of domestic sewage it is common practice to transfer the concentrated solids to a tank to undergo anaerobic digestion. In this tank the major portion of the volatile solids are converted to carbon dioxide and methane as the result of the action of anaerobic bacteria. The resulting gas which is produced in substantial amounts is customarily used either for producing heat to warm the digesters or for operating internal combustion engines, or both. The gas is composed roughly of 60–65 percent methane, approximately 30 percent of carbon dioxide, the remainder being largely nitrogen. If sulfate or sulfur containing organic materials are present in the digester they are converted in considerable amounts to hydrogen sulfide which is evolved with the fermentation gas. This hydrogen sulfide when used in heaters or in internal combustion engines would burn to sulfurous or sulfuric acid. These acids are of course highly corrosive to any metal and damage either the heating burners or the internal combustion engine. Where present in sufficient amounts to cause serious damage it is necessary to scrub the gas for the removal of the hydrogen sulfide. The conventional method for scrubbing gas containing sulfides is to pass it through a box containing shavings coated with ferric oxide. The installation required for scrubbing any considerable volume of gas by this method is quite large and in operation it is necessary to remove the absorbing material and regenerate it. This is laborious and a very disagreeable task. Many attempts have been made to improve on this process, but they have involved expensive chemicals and complicated apparatus.

In the purification of natural gas for the petro-chemical process elaborate equipment is constructed for the removal of the hydrogen sulfide by means of certain absorptive chemicals especially the ethanol amines. The process is highly successful in removing the last traces of hydrogen sulfide which is necessary in the petro-chemical process, but the installation cost of the equipment is high, the operation cost is high and the maintenance on the equipment is high. Some attempts have been made to use alkaline solution such as quick lime or soda for gas purification. This is satisfactory but the chemistry of the process is such that carbon dioxide must necessarily be removed before hydrogen sulfide is removed in substantial amounts. The removal of carbon dioxide is advantageous in that the heating value of the gas is increased but it has not been considered sufficiently advantageous to justify the high cost of chemicals up to the present time.

Water is known to absorb hydrogen sulfide in the ratio of one volume of water to three volumes of hydrogen sulfide. However, water must be purchased for the process. The cost of the water would be considerable. In a sewage plant however, the treated effluent constitutes a satisfactory source of water so that the only cost for the water is the cost of pumping. The use of water in scrubbing sewage gas therefore is particularly advantageous under these particular conditions. Attempts have been made to use water for scrubbing sewage gas by passing the gas upward through a packed tower through which water trickles in a downward direction. The efficiency of packed towers is limited and because of occasional clogging and exhaustion of the packing material their maintenance constitutes a problem.

An object of the present invention is to provide an improved process for scrubbing gas which is simple, effective and economical.

Another object is to provide a process for scrubbing a mixed gas by bringing the gas into contact with a liquid capable of dissolving the gas or gases to be removed from the mixed gas, in which method the gas is brought into contact with the liquid in a novel and improved manner.

A further object is to provide a process for scrubbing sludge gas by bringing the gas into contact with effluent liquid, such as settled plant effluent, which is normally present in a sewage disposal plant and therefore readily available at no extra cost, thus saving the expense of providing any other liquid.

Still another object is to provide a process for scrubbing a mixed gas wherein the gas is forced into a liquid to remove by absorption by the liquid of the gas component to be removed from the mixed gas, such action being effected in such manner that there is no substantial pressure loss in the gas.

A further object is to provide a gas scrubbing process wherein a mixed gas to be scrubbed is forced into a liquid capable of absorbing the gas component to be removed from the mixed gas, in which process the gas is forced into the liquid by the force of jets of the liquid, whereby the pressure of the gas leaving the liquid is as high as or higher than the pressure of the gas entering the liquid.

Another object is to provide a gas scrubbing process wherein a mixed gas to be scrubbed is injected into a body of liquid capable of absorbing the gas component to be removed in such manner that the surface layer of the liquid in contact with the gas is constantly changed and renewed thereby to attain a high rate of absorption.

A further object is to provide a gas scrubbing process wherein a mixed gas to be scrubbed is forcibly driven into a body of liquid by the force of liquid jets into which liquid a material has been previously introduced, which material reacts with the gas component to be removed by either neutralizing it or decomposing it, or both, producing unobjectionable products.

Another object is to provide a new and improved apparatus for scrubbing gas which is simple, effective and economical.

A further object is to provide apparatus for scrubbing gas wherein the gas is brought into contact with a liquid capable of absorbing the gas component to be removed, the arrangement being such that the layer of liquid in contact with the gas is constantly changed and renewed to thereby obtain a high degree of absorption.

A further object is to provide apparatus for scrubbing gas having means for driving the gas into a body of liquid by the force of liquid jets whereby the pressure of the gas leaving the body of liquid may be as high as, or higher than, the initial pressure of the gas.

Still a further object is to provide gas scrubbing apparatus wherein a mixed gas to be scrubbed is forcibly driven into a body of liquid capable of absorbing the component to be removed from the mixed gas by jets of the liquid and wherein the liquid from the body is recirculated to supply a portion of the liquid from the jets.

Other objects and advantages of the invention will appear from the following description taken in connection with the appended drawings, wherein:

FIG. 1 is a side elevational view, with parts broken away and in section, of a gas scrubber tank constructed in accordance with the present invention;

FIG. 2 is an end elevational view of the tank of FIG. 1;

FIG. 3 is a view of a section taken along line 3—3 of FIG. 1;

FIG. 4 is an enlarged view of a section taken along line 4—4 of FIG. 1;

FIG. 5 is a view of a section taken along line 5—5 of FIG. 4;

FIG. 6 is an enlarged end view of a section taken along line 6—6 of FIG. 1; and

FIG. 7 is a diagrammatic view of the gas scrubber system constructed in accordance with the present invention.

In accordance with the present invention, the gas to be scrubbed is introduced into a body of a liquid capable of absorbing the component to be removed. The mixed gas is introduced into the body of liquid at the surface thereof, which surface is constantly maintained in a rapidly changing condition, whereby fresh surface layers of liquid are constantly brought into contact with the gas being introduced into the liquid to thereby effect a high degree of absorption in the liquid of the soluble gaseous components. The mixed gas is caused to flow through the body of liquid which effects further absorption into the liquid of the soluble gas component. In the preferred embodiment of the invention, gas repeatedly escapes from the body of liquid and is reintroduced into the body of liquid. The liquid forming the body is constantly renewed by withdrawing at least some of such liquid and replacing it with fresh liquid as hereinafter explained.

The gas is introduced forcibly into the body of liquid by causing a plurality of jets of the liquid to impinge against the surface of a body of the liquid, such jets being located in a restricted space into which space the mixed gas is introduced so that it is carried downwardly by and driven into the liquid body by the force of such jets. In a preferred embodiment of the invention, at least a portion of the liquid to supply the jets is liquid which is withdrawn from the body of liquid, such being accomplished by recirculating liquid from the body of liquid. However, sufficient liquid is withdrawn from the body continuously and is replaced by fresh liquid to insure that the liquid in the jets which are supplied by recirculated liquid and in the body does not become saturated by the absorbed gas but is capable of absorbing the soluble gas component to an extent sufficient to substantially remove said gas component from the mixed gas.

The jets are utilized to effect local recirculation at the surface of the body of the gas, or both the gas and liquid to thereby increase the absorption. This is effected by bringing into the restricted zone just above the level of the body of the liquid, gas from above the body of liquid, or both such gas and liquid from the body, and forcing the gas, or both gas and liquid, into the body by the energy of the jets.

The gas is caused to flow through the body in a direction opposite to the flow of fresh liquid. Thus, the gas which has received the least scrubbing action is brought into contact with the liquid which is the least fresh, and vice versa. Fresh liquid preferably is introduced into the body along with the gas which has received the most scrubbing. Where the liquid to supply some of the jets is obtained by recirculating the liquid from the body of the liquid, it preferably is introduced into the body along with the gas which has received the least scrubbing.

The invention also contemplates in its preferred form the introduction into the liquid of an additive in the form of a chemical capable of neutralizing the component or decomposing it, or both, producing unobjectionable products which will be retained in the liquid.

In the preferred form of the invention, it is desired to remove hydrogen sulfide from sludge gas. Accordingly, it is preferred to introduce into the scrubbing liquid chlorine which reacts with the hydrogen sulfide to form hydrogen chloride and sulfur. The former is absorbed in the liquid and the latter is retained as an insoluble solid and does not pass out with the sludge gas but remains suspended in the liquid in finely divided form and is withdrawn from the body along with the liquid.

Other materials which may be employed in lieu of chlorine are oxygen, sulphur dioxide or other oxidizing agents such as hydrogen peroxide. Such materials, while effective, are presently less ecomonical than chlorine and therefore the latter is preferred.

Other materials which may be used in the process in lieu of chlorine are water-soluble alkalies such as lime, sodium carbonate, ammonia, amines, and the like. However, since these materials remove carbon dioxide preferentially, it is necessary to remove most of the carbon dioxide before any hydrogen sulfide is removed. Therefore the use of such alkalies is presently less ecomonical than the use of chlorine. It is also contemplated to use less soluble alkalies in finely divided solid form.

Preferably, all of the aforementioned chemical additives are introduced by adding them to the affluent liquid. It will be seen that the present invention is especially suited to the use of such additives since where the additive is introduced into the affluent liquid, the action of the jets effects a very thorough mixing of the additive with the gas mixture to be scrubbed.

The liquid used in the process in accordance with the present invention is a liquid which is capable of absorbing by dissolution the gas component to be removed from the mixed gas. While fresh water is highly desirable, nevertheless we prefer to use liquid which is available in the installation in which the scrubber is located in order to minimize the cost of the liquid. For example, in the preferred form of the invention where the scrubber is installed in a sewage treatment plant, we prefer to use settled plant effluent which, as is known, essentially is water but contains a small percentage of dissolved and/or suspended materials. Accordingly, where the expression "water" is used herein without further qualification, it will be understood that it is not limited to pure fresh water but includes also settled plant effluent.

Referring now to the drawings, there is shown a preferred form of apparatus for carrying out the present invention which apparatus will be described in connection with a preferred form of the process according to the present invention.

The preferred form of apparatus shown in the drawings comprises a scrubber tank 10, FIG. 1, having means for circulating therethrough the gas to be scrubbed and a scrubbing liquid in counter current directions. The scrubber tank 10 is mounted on a suitable base 11 which preferably takes the form of a cradle rigidly supporting the tank in the desired position. Projecting through and supported by the top wall of the tank 10 are a plurality of injection units 12, 13 and 14, the upper portions of each of which projects upwardly of the top wall of the tank 10 and provides a dome for a purpose which will hereinafter appear. The three injection units 12, 13 and 14 are generally similar and therefore only one of them will be described in full detail, it being understood that the other two are similar except as hereinafter explained.

The injection unit 12 includes a vertical cylindrical housing member 20 defining a vertical chamber 21 which chamber is open at its bottom end to provide free communication between such chamber and the interior of the tank 10. Further communication between the chamber 21 and the interior of the tank 10 is provided by a circumferential slot 22 formed in the jet head body housing 20, the purpose of which slot will hereinafter appear. The slot 22 is formed preferably by attaching a lower body section 23 to the main body of the housing 20 by a plurality of straps 24, as seen more particularly in FIG. 6 of the drawing.

A gas inlet 25 leads into the projecting or dome portion of the jet head body housing 20 which inlet is defined by pipe 126 having a flange 27 (FIG. 3) for attachment to a gas line (not shown) leading from a source of gas.

Disposed within the chamber 21 at a substantial distance above the top of the slot 22, is a jet head 26 preferably of drum shape and shown more in detail in FIGS. 4 and 5. The jet head 26 includes a body 30 defining a chamber 31 and is carried by and connected to a vertical water inlet pipe 32 which in turn is connected to a source of water as hereinafter more fully explained.

The jet head 26 is formed with a bottom wall having a plurality of jet orifices communicating with the interior of the head and adapted to project a plurality of jets of water downwardly when water under pressure is introduced into the jet head 26. The bottom wall is so formed that the size of the orifices may be changed in order to meet different conditions of operation. To this end the bottom wall is of double construction and includes an inner wall 33 forming a fixed portion of the jet head 26 and having a plurality of orifices 34 and an outer wall 35 formed with a plurality of orifices 36 arranged to register with the orifices 34. The outer plate 35 is detachably secured to the inner plate as by a bolt 37 and nut 38 and hence may be replaced by another outer plate (not shown) having orifices of a different size than the orifices 34 of the bottom plate shown.

The orifices 36 in the jet head 26 are disposed in position to project a plurality of jets of water downwardly against the surface of the body W of water in the scrubber tank. It should be understood at this point that the jets are true, well concentrated jets and therefore impinge against the surface of the body W with considerable force and are not dispersed sprays. The purpose of this will appear hereinafter.

The jet injection units 13 and 14 (FIG. 1) and jet heads 26 contained therein are similar to the unit 12 except that instead of being provided with a gas inlet leading from an exterior connection each of the units 13 and 14 is provided with a gas connection pipe 40 leading from the interior of the tank 10 to the upper portion of the jet head housing. The injection units 12, 13 and 14 are disposed in compartments 45, 46 and 47 defined by partition members 48, 44 and 50. It will be noted that the partition members 44 and 50 extend downwardly from the upper wall of the tank 10 to short of the bottom of the tank but the partition 48 terminates short of both the top and the bottom of the tank 10.

Supported on the wall of the tank 10 (FIG. 1) is a gas outlet dome 51 which opens into the compartment 47 and is provided with a gas outlet pipe 52. The gas outlet dome 51 is provided with a liquid inlet 53 leading to a spray head (not shown) through which a defoamant liquid may be introduced into the tank in order to minimize foaming of the liquid within the tank. Such defoamant may consist of any suitable material such as fuel oil which will prevent or minimize foaming of the water upon the impingement of the jets against the surface of the body of water in the tank as hereinafter explained.

It will now be seen that gas may pass into the tank through the inlet 25, downwardly through the jet head housing 20 in the unit 12 and out through the slot 22 and/or the open bottom of the housing 20, and into the compartment 45, then through the gas connection 40 into the injection unit 13 through which the gas passes and enters the compartment 46 from which it passes through the second gas connection pipe 40 to the injection unit 14 from whence it passes into the compartment 47 and then out through the dome 51 and gas outlet pipe 52. The gas outlet pipe 52 leads to a point of storage or use (not shown).

Water is supplied to the jet head 26 in the injection unit 14 through a water inlet pipe 60 which leads from a suitable source (not shown) of water such as settled plant effluent or other siutable source, and is connected to the vertical water inlet pipe 32 which carries the jet head 26. The water inlet pipe 60 is connected to a water recirculation pipe 61 connected in turn to the inlet pipes 32 of the jet heads 26 in the injection units 12 and 13, so that fresh water may be supplied to such heads if this be desired. However, a valve 62 is provided for closing such connection inasmuch as the jet heads in the units 12 and 13 are preferably supplied by recirculating water from the tank 10 as hereinafter explained.

In accordance with the preferred embodiment of the invention, water to supply the jet heads in the injection units 12 and 13 is obtained by recirculating water from the tank 10. To this end an outlet 65 is provided adjacent the bottom of the tank and preferably at the end portion thereof in which the gas outlet is located. The water outlet 65 is connected to a recirculating pipe 66 (FIG. 7) which leads to the water inlet pipes 32 of the injection units 12 and 13. A suitable pump 67 is connected in the pipe 66 for pumping the liquid from the tank to the jet heads 26 of the injection units 12 and 13 and valves are provided in the pipes 32 for controlling the flow of liquid therethrough.

A water outlet 70 (FIG. 1) is provided adjacent the bottom of the tank in the compartment 71 defined by the partition 48 and the adjacent end of the tank This water outlet may be connected to any suitable line (not shown) for conducting the liquid away from the tank 10 for further use or treatment, or for disposal.

The level of the water in the tank preferably is controlled to maintain it at a predetermined height by an outlet valve 72 (FIG. 1) the operation of which is controlled by a float 73 carried on a valve stem 74 projecting upwardly from the valve. The float is supported on the valve stem 74 for vertical adjustment theron by a tube 75 connected to the float 73 and having at its upper end a nut 76 threaded on the valve stem 74. The height of the float 73 relative to the valve 72 is adjusted by rotating the tube 75 (and connected float 73) relatively to the valve stem 74.

The valve stem 74 and tube 75 project upwardly into a flange 78 secured over an opening in the upper wall of the tank and having an outward extension 77 closed by a pipe cap 79. Thus, access is provided to the valve stem 74 and tube 75 to permit any adjustment which may be desired.

The float 73 preferably is adjusted to a height to cause the liquid W to stand in the tank at a level just above the bottom of the slot 22 in each of the injection unit housings 20. As explained hereinafter, this adjustment provides for recirculation through the housing 20 of both the water in the tank and the gas standing above the water.

Means are provided for preventing water from flowing back to the gas line should the water outlet line be blocked or the outlet valve stick. Such means includes a vent 80 (FIG. 1) leading from the tank 10 below the normal level of water and rising to such height that it provides a water seal sufficient to resist the outflow of water or gas therethrough so long as the normal gas pressure is maintained below a predetermined maximum. However, should the level of the water in the tank rise to the level of the gas outlet, as might happen should the water outlet line be blocked or the discharged valve fail to open, then the water will not pass out through the gas outlet but will be discharged through the vent.

In carrying out the invention in accordance with the preferred embodiment and utilizing the preferred form of structure shown in the drawings, the gas inlet pipe 126 (FIG. 1) is connected to a source (not shown) of gas to be scrubbed. While as above stated, the process is adapted to scrubbing various mixed gases in order to remove an undesired component therefrom, the present invention is particularly directed to removing hydrogen sulfide from sludge gas. Accordingly, in the preferred formed of the invention, the gas inlet is connected to the outlet from a sludge digester (not shown) ar a gas storage tank (not shown) supplied from the digester. The gas outlet pipe 52 is connected to storage means (not shown) or utilization means (not shown) for the sludge gas. Such gas after scrubbing may be used for heating or for operating internal combustion engines, or both, as hereinabove mentioned.

The gas passes successively through the injection units 12, 13 and 14, the corresponding compartments 45, 46 and 47, and out through the gas outlet dome 51 and outlet pipe 52. The gas flows through the scrubber by reason of the pressure of the gas and any increase in pressure which may be imparted thereto by the jets, as hereinafter explained. The pressure of the gas is not critical and it may be introduced into the scrubber at any pressure which will cause the gas to flow and is not so high as to make it difficult to handle the gas or cause it to be likely to damage the apparatus. Ordinarily the gas pressure will be approximately 18 to 21 inches of water.

By reason of the fact that the gas is carried down to the surface of the body of water in the tank and is driven into the body by the force of the jets, there is no pressure loss in the gas. In fact, under certain circumstances, the action of the jets in driving the gas into the body of liquid may be utilized to actually increase the pressure of the gas within the tank so that the gas leaves the tank under higher pressure than it enters the tank. In other words, the energy required in forcing the gas into the liquid is obtained almost entirely from the water jets and not from the gas.

The water inlet 60 (FIG. 1) is connected to a suitable source (not shown) of water which in the preferred embodiment of the invention is settled plant effluent. The water flows into the inlet pipes 32 and into the interior of the jet heads 26 from which it is discharged through the jet openings 34 and the jet openings 36, the arrangement being such that the jets discharged from the jet openings 36 are projected downwardly and impinge against the surfaces of the water of the body W of water in the tank. While the pressure under which the jets are discharged is not sharply critical, nevertheless the water should be introduced into the inlet pipe 60 under sufficient pressure to provide jets having substantial force. We have found that if the pressure of the liquid is from about 3 pounds per square inch to about 15 pounds per square inch, very satisfactory results are obtained.

The downward movement of the water forming the jets causes the gas to be drawn downwardly within the casing 20 of each injection unit and the force of the jets causes the gas to be driven forcibly into the liquid forming the body W. Moreover, the jets cause substantial turbulence of the water at the surface of the body. Thus there is provided an increased area of liquid for contact by the gas which results in an absorption of the soluble component of the gas by the liquid to a much greater extent than if the gas were brought into contact with the quiescent surface of the water or bubbled through the water.

The turbulence effected by the jets impinging against the surface of the body of liquid in the tank and also the local recirculation, as elsewhere herein explained, constantly changes and renews the water forming the monomolecular layer at the gas-liquid interface so that fresh liquid is constantly brought into the layer. Thus the water forming such layer does not become saturated but is constantly capable of absorbing gas.

When the jets impinge against the surface of the body W of water and drive the gas into the surface of the water, the water and gas are forced downwardly into the body and the gas passes downwardly through the open end of the housing 20 and thence upwardly through the water and escapes from the surface in the chamber 47 externally of the housing 40.

The absorption in the water of the hydrogen sulfide is increased by recycling the water and gas locally at the surface of the body of water. This is accomplished by the provision of the slot 22 in the casing 20. Where, as in the present example, the level of the water is just above the bottom of the slot 22, both gas and water are drawn into the casing 20 through the slot 22 and mixed with the water of the jets. The gas which is driven downwardly by the jets thus effects a thorough mixing of the water from the body and the gas above the body with the water and gas being projected downwardly within the casing 20. The water stream in each of the chambers 21 sucks into itself a quantity of gas in excess of that which is supplied to the scrubber, thus causing bubbles of gas to be mixed in the stream under a higher pressure than that of the entering gas, thereby increasing the absorption rate of the gas. Since the rate of the gas passing into the liquid is in excess of that supplied to the scrubber, a portion equal to such excess is recycled and retreated.

As stated hereinabove, the level of the body of liquid may be controlled so as to maintain it above the top of the slot 22, in which case only water will be recirculated through the slot; or below the bottom of the slot, in which case only gas will be recirculated through the slot; or between the top and bottom of the slot, in which case both gas and liquid are recirculated through the slot.

The absorption of the undesired component into the water may be greatly facilitated and increased by the addition of a material to the water, as above described, which increases the solubility of the gas in the liquid, or reacts with the gas by either neutralizing it or decomposing it, or both, producing unobjectionable products. In the preferred embodiment of the invention wherein it is desired to remove hydrogen sulfide from water, we add to the water chlorine gas, which reacts with the water to form hypochlorous acid and hydrochloric acid and the hypochlorous acid reacts with the hydrogen sulfide to form hydrochloric acid, sulfur and water. The hydrochloric acid is highly soluble in the water and the sulfur is insoluble. The hydrochloric acid thus passes out of the tank with the water, in dissolved condition, and the sulfur passes out of the tank in the form of finely divided solid particles in suspension in the water.

Chlorine in the form of a gas or a soluble hypochlorite may be added to the water at any desired point. For example, it may be added to the water prior to introduction of the water into the tank through the jets, or to the water in the tank, or to the water being recirculated.

We prefer to add the chlorine or a soluble hypochlorite to the scrubbing water rather than to the gas which is to be scrubbed for the reason that the hydrochloric acid produced in this reaction remains dissolved in the water and passes out with the discharged scrubbing water, whereas it has been found that chlorine gas reacting with the hydrogen sulfide gas in the digester gas produces gaseous hydrochloric acid, which hydrochloric acid combines with moisture to form droplets of hydrochloric acid solution which are not subsequently removed in the scrubbing process and pass out, contaminating the scrubbed gas.

As stated hereinbefore, the additive preferably is introduced into the system in the affluent water, whereby the additive is thoroughly mixed with the water before the water is brought into contact with the gas. We have found that one part per million of chlorine in the water will remove eleven grains of hydrogen sulfide from the sludge gas. Accordingly, knowing the concentration of hydrogen sulfide in the mixed gas to be scrubbed, the proper amount of chlorine is introduced in the affluent water in order to effect the most efficient scrubbing of the gas and the most economical utilization of the chlorine. The remaining components of the gas, consisting principally of methane, carbon dioxide and nitrogen, are in part absorbed by the water, which eventually passes out of the tank, and those portions of the gas which are not absorbed pass out of the tank through the gas outlet 52. However, none of the remaining components of the gas mixture which pass from the tank are harmful to heaters, internal combustion engines or other devices to which the gas is normally passed for utilization.

It will be understood that while the process may be carried out in a single phase, that is to say the process may be carried out by injecting the gas into the body of liquid only once, whereafter the gas is caused to pass out of the scrubber tank, we prefer to use a multi-stage process wherein the gas is successively injected into the body of liquid a plurality of times, after each of which injection step the gas is allowed to pass from the body of liquid and again is injected into the body. This multi-stage operation provides for a more complete removal of the hydrogen sulfide from the sludge gas than does a single stage process.

Accordingly, we provide one or more and preferably a plurality of injection units 12 and 13 (FIG. 1) arranged serially ahead of the injection unit 14 through which units the gas is passed successively before being passed through the injection unit 14. While, as above stated, the earlier injection units 12 and 13 may be supplied with "raw" water, nevertheless for purposes of economy we prefer to supply such units with water recirculated from the tank 10 which water has already been used for scrubbing the gas passed through the injection unit 14 and which is collected in the tank.

Thus, in the preferred embodiment of the invention, the gas is passed through the injection units 12 and 13, which are supplied with recirculated water through the recirculation pipe 66, and thence is passed through the injection unit 14 which is supplied with raw water through the raw water inlet 60.

In lieu of providing the several compartments by partitioning a single tank, a plurality of separate tanks or housing members (not shown) may be provided. The separate tanks are connected at their lower portions for relatively free passage of liquid between the interiors of the separate tanks. A jet head body housing (not shown) is disposed in each compartment and contains a jet head (not shown) such as shown in FIG. 1. Means (not shown) are provided for passing the gas to be treated into a first tank, the interior of which is connected to the interior of the jet head body housing in the next tank (and the remaining tank or tanks, if any, are similarly connected) for flow of the gas serially through the jet head housings and tanks and discharge from the last tank in a manner analogous to the manner in which gas is passed through the apparatus in FIG. 1. Means (not shown) are provided for the introduction, recirculation and outflow of water in a manner analogous to that of the apparatus shown in FIG. 1.

While we may supply "raw" water to each of the injection units, we have found that it is not necessary to a successful operation and is less economical than recirculating to one or more of the units, water from the tank.

The inlet pipe 53 leading into the gas dome 51 is connected to a suitable source (not shown) of a deformant liquid under pressure whereby such liquid is supplied to the tank and sprayed on the surface of the water in the tank in order to prevent or at least minimize any foaming which may result from the projection of the jets against the surface of the water in the tank.

Both the gas and the water are continuously supplied to the tank 10 and withdrawn therefrom so that there is a continuous flow of gas and water through the tank under ordinary conditions of operation.

We have found that it is possible to scrub effectively two volumes of gas for one volume of "raw" water— that is, water introduced into the tank and which has not previously been used for scrubbing gas. Accordingly, the rate of flow of the water through the tank and the rate of flow of the gas in the tank are adjusted to provide a flow of approximately two volumes of gas for each one volume of water passing through the tank.

From the foregoing it will be seen that the present invention provides a novel process for removing a selected component from a mixed gas which process is simple, effective and inexpensive. The invention also provides novel apparatus for effectively carrying out the process which apparatus is simple and inexpensive.

We claim:

1. Apparatus for scrubbing gas comprising a scrubber tank for containing a body of liquid and having a liquid inlet and outlet and a gas inlet and outlet, means for introducing liquid under pressure through said inlet, jet-forming means including a jet head disposed above the level of said body of liquid and connected to said liquid inlet for directing against the surface of the body of liquid in said tank a plurality of jets of liquid, housing means in said tank surrounding said jets extending downwardly into said body of liquid and defining a chamber having an open lower end, means for withdrawing liquid from said tank, means for maintaining the level of said liquid above the bottom of said housing means and below said jet head, and means connected to said gas inlet for introducing directly from a source externally of said tank a gaseous material into said chamber around and between said jets whereby said jets forcibly drive said gas into said body of liquid, and all the gas entering said tank is caused to pass through said body of liquid.

2. Apparatus for scrubbing gas comprising a scrubber tank for containing a body of liquid and having a liquid inlet and outlet and a gas inlet and outlet, and a jet-forming head connected to said liquid inlet for directing against the surface of the body of liquid in said tank a plurality of jets of liquid, housing means in said tank surrounding said head and extending into said body of liquid and terminating short of the bottom of said tank to define a chamber, and means connected to said gas inlet for introducing a gaseous material into and between said jets in said chamber whereby said jets forcibly drive said gas into said body of liquid, said housing means having an open lower end and having an annular opening therein spaced above its lower end, and above and closely adjacent the level of the liquid body, whereby gas is drawn into said chamber from above said liquid body and driven into said body of liquid.

3. Apparatus for scrubbing gas comprising a scrubber tank for containing a body of liquid and having a liquid inlet and outlet and a gas inlet and outlet, jet-forming heads connected to said liquid inlet for directing against the surface of a body of liquid in said tank a plurality of jets of liquid, housing means in said tank surrounding said heads and extending into said body of liquid and terminating short of the bottom of said tank to define a chamber, and means connected to said gas inlet for introducing a gaseous material into and between said jets in said chamber whereby said jets forcibly drive said gas into said body of liquid, said housing means having an open lower end and having an annular opening therein spaced above its lower end, and partially above the level of the body of liquid, whereby liquid from said body and gas from above said liquid body are drawn into said chamber and driven into said body of liquid.

4. Apparatus for scrubbing gas comprising a scrubber tank for containing a body of liquid and having a liquid inlet and outlet and a gas inlet and outlet, a plurality of vertically extending partitions extending downwardly from the top wall of said tank to short of the bottom wall and defining a plurality of compartments arranged in side-by-side relation and intercommunicating at their lower ends, means including a jet head in each compartment for directing against the surface of said body of liquid in said tank a plurality of liquid jets, housing means in each of said compartments extending downwardly from said top wall and into said liquid and having an open bottom end, said housing means surrounding the corresponding jet head and jets to cause all of the gas entering said housing means to pass through said body of liquid, and means for conducting gas in said tank successively through said housing means and said compartments.

5. Apparatus for scrubbing gas comprising a scrubber tank for containing a body of liquid and having a liquid inlet and outlet and a gas inlet and outlet, a plurality of vertically extending partitions extending downwardly from the top wall of said tank to short of the bottom wall, and each defining a series of compartments disposed in side-by-side relation, housing means in said compartments defining chambers each having an outlet at its lower end opening into the liquid in corresponding compartment, means including a jet head in each chamber for directing against the surface of said body of liquid in the corresponding compartment a plurality of liquid jets, and means connecting each of said compartments with the upper portion of the chamber in the next succeeding compartment above the jet head for conducting gas in said tank successively through said chambers and compartments, whereby all of the gas entering said tank is caused to pass through said body of liquid.

6. Apparatus for scrubbing gas comprising a scrubber tank for containing a body of liquid and having a liquid inlet and outlet and a gas inlet and outlet, a plurality of vertically extending partitions extending downwardly from the top wall of said tank into said body and to short of the bottom wall, and defining a series of compartments disposed in side-by-side relation, housing means in said compartments defining chambers each having an outlet at its lower end opening into the corresponding compartment below the liquid level, jet heads in said chambers above the liquid level for directing against the surface of the body of liquid in said tank a plurality of liquid jets, at least one of which jet heads is connected to said liquid inlet, means connecting each of said casing-containing compartments with the upper portion of the chamber in the next succeeding compartment above the jet head for conducting gas in said tank successively through said chambers, whereby all the gas entering each chamber is caused to pass through said body of liquid, means connecting said tank below the level of the bottom of said housing means to at least one of said jet heads, and means externally of said tank for circulating liquid through said connecting means.

7. Apparatus for scrubbing gas comprising means providing a series of compartments arranged in side-by-side relation for containing a body of liquid and interconnected at their lower portions for relatively free flow of liquid therebetween, a chamber in each compartment above and opening at its bottom into said liquid body, jet forming means in each chamber for directing against the surface of the liquid in each chamber a plurality of liquid jets, means for introducing a gas into said chambers around and between said jets, means for introducing raw gas to be treated into the first of said series of chambers, means connecting each of said chambers, except the first of the series, above the level of the liquid level therein to the gas introducing means in the next preceding chamber, whereby all of the gas entering each chamber passes through the liquid in said compartments, and means for discharging gas from the last chamber of the series.

8. Apparatus for scrubbing gas comprising tank means defining a series of compartments for containing a body of scrubbing liquid, housing means in each said compartments above and extending downwardly into said body of liquid and defining a chamber having an open lower end below the level of said body of liquid, a gas inlet leading directly into a first of said chambers from externally of said tank means, conduit means connecting each of said compartments, except the last of the series, above the level of the liquid with the chamber in the next compartment of the series, a gas outlet leading from said last compartment, jet-forming means in each chamber for directing against the body of liquid in the corresponding compartment a plurality of jets of scrubbing liquid to drive the gas in said chamber forcibly into the liquid below said chamber means for withdrawing liquid from said tank, and means for maintaining the level of the liquid above the bottom of said housing means and below said jet-forming means.

9. Apparatus for scrubbing gas which apparatus comprises a tank containing a body of liquid means including a wall above and extending downwardly into said body of liquid and defining a confined zone above said body of liquid and open at its lower end, jet-forming means for projecting forcibly against said body of liquid a plurality of jets of said liquid in said confined zone and spaced from each other and from said wall, means for withdrawing liquid from said tank, means for maintaining the level of liquid in said tank above the bottom of said wall and below said jet-forming means, and means for introducing gas into said zone around said jets, whereby all of said gas thus introduced is forcibly driven into said body of liquid by said jets whereby said gas is exposed to a continually changing and agitated water surface and at least a portion of said gas is absorbed by said liquid.

10. Apparatus as set forth in claim 9 wherein is provided means including a wall above and extending downwardly into said body of liquid and defining a second confined zone above said body of liquid and open at its lower end, said second zone being spaced laterally from said first zone, means for projecting forcibly against said body in said second zone a plurality of jets of said liquid spaced from each other and from said wall and means for introducing into said second zone around said jets gas which has passed serially through said first zone and said body of liquid.

11. Apparatus as set forth in claim 9 wherein an opening is provided in said wall above and adjacent the lower end of said zone and said body of liquid at a location whereby gas which passes from said body of liquid adjacent said wall is sucked into said zone and again driven into said body by said jets.

References Cited in the file of this patent
UNITED STATES PATENTS

| | | |
|---|---|---|
| 1,944,122 | Fife | Jan. 16, 1934 |
| 2,020,850 | Myhren et al. | Nov. 12, 1935 |
| 2,128,311 | Mertes | Aug. 30, 1938 |
| 2,213,211 | Fleckenstein et al. | Sept. 3, 1940 |
| 2,398,345 | Cooper | Apr. 16, 1946 |
| 2,463,975 | Johnson | Mar. 8, 1949 |

OTHER REFERENCES

Mellor: "A Comprehensive Treatise on Inorganic and Theoretical Chemistry," Longmans, Green and Co., New York, N.Y., vol. 2, page 92, 1922.